Patented Nov. 2, 1926.

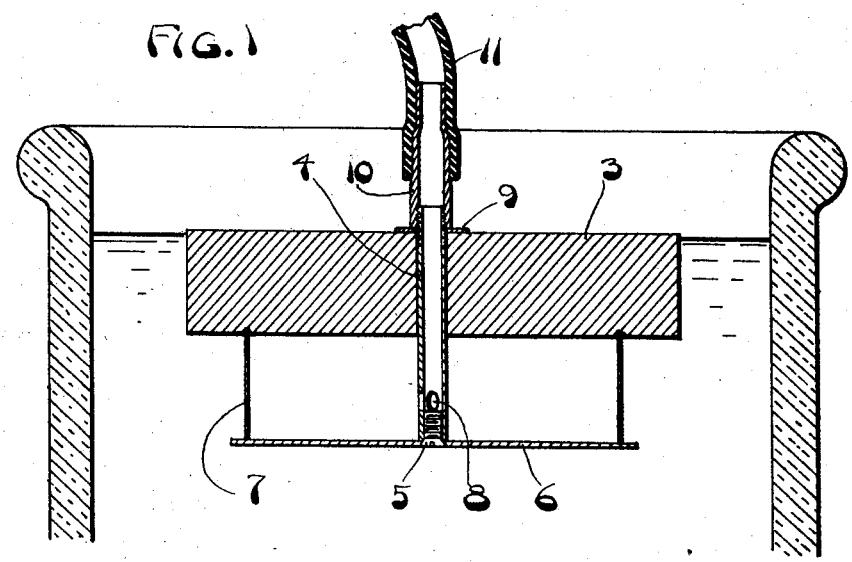
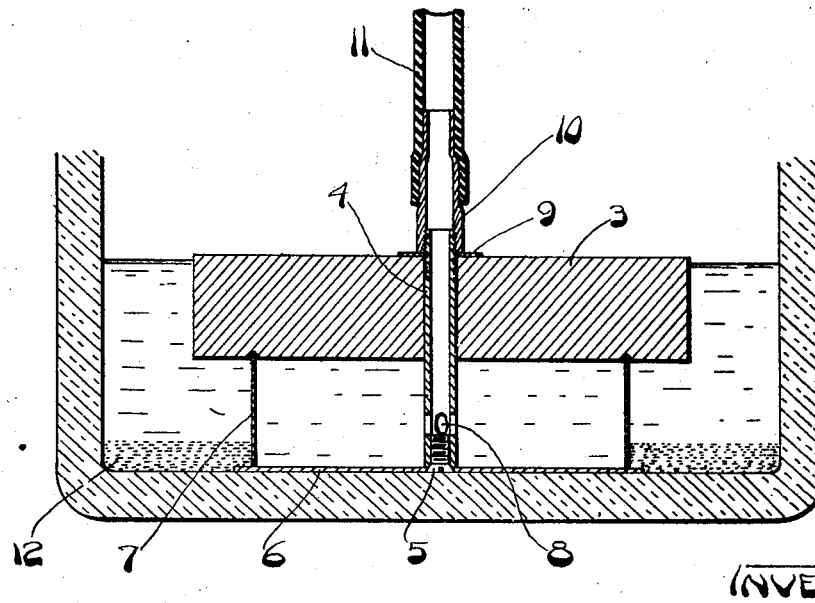

1,605,207

UNITED STATES PATENT OFFICE.

WILLIAM N. BITTE, OF CINCINNATI, OHIO.

FLOATING FILTERING SIPHON.

Application filed March 9, 1926. Serial No. 93,528.

This invention is designed for and has for an object to produce a floating siphon which also operates as a filter especially adapted for use in connection with any fluid material wherein sediment accumulates in the course of its preparation and in which the clarified liquid has to be separated therefrom.

A further object is to produce a construction that can be manufactured cheaply and of a nature which will permit of complete dismantling or disassembling for purposes of cleaning, without having to resort to the use of more than the simplest of tools, if any at all are found to be necessary.

These and other objects are attained in the floating filtering siphon described in the following specification and illustrated in the accompanying drawing, in which:—

Fig. 1 is a fragmental sectional elevation of a siphon embodying my invention, located in a tank, vat or crock containing the fluid to be siphoned and filtered, occupying the position it takes at the beginning of the operation.

Fig. 2 is a view similar to Fig. 1, but showing the siphon in the position it occupies just at the time the operation has practically been completed.

In the construction of the siphon I employ a body portion 3 which is preferably a disc of buoyant material such as wood. Through this centrally a hole is bored to receive an intake nipple 4. This nipple is internally screw threaded at its lower end to receive a screw 5 which retains a stabilizing disc 6 against the end of the nipple as shown. Between the disc and the body is a cylindrical screen 7 which is provided with minute perforations throughout and through which the fluid may pass. Above the screw 5 the nipple is provided with apertures 8 through which the fluid may pass, while the upper end of the nipple is externally screw threaded. Over this upper end a washer 9 is placed, and a hose connection 10 is screwed down upon the nipple to bind the body, screen and disc together to make them a centralized unit. This hose connection is shaped to receive the hose or tubing 11 through which the fluid is drawn off.

This siphon is intended to be used only after or even before the sediment accumulates at the bottom of the vessel as shown at 12 in Fig. 2, and is placed in position by floating it on the surface of the fluid as shown in Fig. 1. Siphon action is started in the usual well known manner and the floating siphon is allowed to settle down as the level of the fluid in the vessel becomes lowered. Finally, as the bottom is reached and the disc 6 rests thereon, the sediment 12 is for the most part blocked from entrance to the siphon by the minute perforations in the screen 7. What portion of the sediment does pass through the perforations of the screen, is further blocked by the fact that the openings 8 in the nipple are located a sufficient distance above the disc to prevent it from being drawn off through the hose. For especially fine filtering the action may be repeated as often as is necessary to obtain the desired result.

In the period of its usage the siphon will always float on the surface of the fluid and in the position shown. This is assured by the weight of the stabilizing disc 6. Also, after usage there is but one operation necessary in order to take the siphon to pieces in order to give it a thorough cleaning. This operation consists merely in unscrewing the hose connection from the nipple and lifting the parts from each other.

Having thus described my invention what I claim is:—

1. A floating filtering siphon comprising a buoyant body portion, a screen on the underside of the body portion, a disc closing the bottom of the screen, a nipple connected with the disc, extending through the body portion and having an opening to the chamber enclosed by the body, screen and disc, and means on the nipple above the body, uniting the body, screen and disc.

2. A floating filtering siphon comprising a buoyant body portion, an imperforate disc beneath the body, a screen located between and spacing the body and disc apart, a nipple connected with the disc and having an opening in the chamber between the body screen and disc and extending through the body, and a hose connection on the upper end of the nipple, uniting the body, disc, screen and nipple.

In witness whereof, I affix my signature.

WILLIAM N. BITTE